United States Patent
Dunne, Jr. et al.

(10) Patent No.: US 9,878,614 B1
(45) Date of Patent: Jan. 30, 2018

(54) ALL-TERRAIN VEHICLE

(71) Applicant: Textron Inc., Providence, RI (US)

(72) Inventors: John C. Dunne, Jr., Costa Mesa, CA (US); Jon C. Charland, Long Beach, CA (US); Jared Trauernicht, Corona, CA (US); Hayden Barr, Laguna Niguel, CA (US); Eric Anderfaas, Westminster, CA (US)

(73) Assignee: Textron Innovations Inc., Providence, RI (US)

( * ) Notice: Subject to any disclaimer, the term of this patent is extended or adjusted under 35 U.S.C. 154(b) by 115 days.

(21) Appl. No.: 15/007,850

(22) Filed: Jan. 27, 2016

(51) Int. Cl.
| | | |
|---|---|---|
| *B62K 17/00* | (2006.01) | |
| *B60K 17/22* | (2006.01) | |
| *B60K 13/04* | (2006.01) | |
| *B60K 17/348* | (2006.01) | |
| *B60K 17/16* | (2006.01) | |
| *B60R 21/13* | (2006.01) | |

(52) U.S. Cl.
CPC .............. *B60K 17/22* (2013.01); *B60K 13/04* (2013.01); *B60K 17/16* (2013.01); *B60K 17/348* (2013.01); *B60R 21/13* (2013.01)

(58) Field of Classification Search
CPC ........ B60K 17/22; B60K 13/04; B60K 17/16; B60K 17/348; B60R 21/13
See application file for complete search history.

(56) References Cited

U.S. PATENT DOCUMENTS

| | | | | |
|---|---|---|---|---|
| 4,752,086 A | * | 6/1988 | Hotta .................... | B62D 21/02 280/124.134 |
| 4,804,199 A | * | 2/1989 | Picard .................. | B62D 47/006 280/33.998 |
| 7,219,925 B2 | * | 5/2007 | Hill ....................... | B60R 21/055 280/730.1 |
| 7,377,351 B2 | * | 5/2008 | Smith .................... | B60K 17/354 180/233 |
| 7,578,523 B2 | * | 8/2009 | Kosuge ................ | B62D 21/186 280/756 |
| 7,717,495 B2 | * | 5/2010 | Leonard .................... | B60T 7/06 180/311 |
| 7,795,602 B2 | * | 9/2010 | Leonard ................. | B60N 3/023 250/494.1 |
| 7,950,486 B2 | * | 5/2011 | Van Bronkhorst .. | B60G 15/063 180/89.11 |
| 8,002,331 B2 | * | 8/2011 | Bowers ................ | B60N 2/3013 296/183.2 |

(Continued)

*Primary Examiner* — Kevin Hurley
*Assistant Examiner* — Michael R Stabley
(74) *Attorney, Agent, or Firm* — Polster Lieder

(57) ABSTRACT

An all-terrain vehicle is provided comprising a chassis, four wheels and a passenger compartment that includes a passenger seating structure. The vehicle additionally comprises a drivetrain operatively connected to at least one of the wheels comprising at least one drive shaft and at least one torque transfer device. Furthermore the vehicle includes a prime mover that is mounted to the chassis forward of the seating structure and operatively connected to the drivetrain. The prime mover is structured and operable to provide motive force to at least one of the wheels. In various instances the prime mover is mounted to the chassis such that it has a longitudinal orientation relative to a longitudinal axis of the vehicle. Additionally, in various instances wherein the torque transfer device is a transmission, the transmission is mounted such that it has a longitudinal orientation relative to the longitudinal axis of the vehicle.

27 Claims, 6 Drawing Sheets

(56) References Cited

U.S. PATENT DOCUMENTS

| | | | | |
|---|---|---|---|---|
| 8,037,959 B2 * | 10/2011 | Yamamura | B62D 25/084 | 180/68.4 |
| 8,177,008 B2 * | 5/2012 | Yamamura | B62D 5/04 | 180/443 |
| 8,328,235 B2 * | 12/2012 | Schneider | B60J 5/0487 | 280/748 |
| 8,640,814 B2 * | 2/2014 | Deckard | B60N 2/01 | 180/312 |
| 8,672,387 B1 * | 3/2014 | Kaku | B60R 7/02 | 296/65.05 |
| 8,899,620 B1 * | 12/2014 | Bhardwaj | B60R 21/13 | 280/756 |
| 8,973,693 B2 * | 3/2015 | Kinsman | B60R 21/13 | 180/89.1 |
| 8,998,253 B2 * | 4/2015 | Novotny | B60R 21/13 | 280/756 |
| 9,145,092 B1 * | 9/2015 | Reynolds | B60R 21/11 | |
| 9,393,894 B2 * | 7/2016 | Steinmetz | B60N 3/06 | |
| 9,440,671 B2 * | 9/2016 | Schlangen | B60G 3/20 | |
| 9,463,745 B2 * | 10/2016 | Reynolds | B60R 9/02 | |
| 9,539,871 B2 * | 1/2017 | Suzuki | B60G 3/20 | |
| 2004/0195018 A1 * | 10/2004 | Inui | B62D 3/12 | 180/68.1 |
| 2004/0195797 A1 * | 10/2004 | Nash | B60G 7/02 | 280/124.136 |
| 2006/0006696 A1 * | 1/2006 | Umemoto | B62D 33/0617 | 296/190.08 |
| 2008/0093883 A1 * | 4/2008 | Shibata | B60J 5/0487 | 296/146.9 |
| 2014/0124279 A1 * | 5/2014 | Schlangen | B60G 3/20 | 180/68.4 |
| 2016/0096478 A1 * | 4/2016 | Reynolds | B60R 9/02 | 280/834 |

* cited by examiner

ALL-TERRAIN VEHICLE

FIELD

The present teachings relate to light weight vehicle engine and drivetrain configurations, and more particularly to off-road side-by-side vehicle engine and drivetrain configurations.

BACKGROUND

The statements in this section merely provide background information related to the present disclosure and may not constitute prior art.

Known light weight off-road vehicles, e.g., side-by-side vehicles (SSV's) and utility task vehicles (UTVs), have engines that are disposed in the rear of the vehicle (e.g., behind the passenger compartment), or in the middle of the vehicle (e.g., at least partially under the seat(s)). Additionally, such off-road, all-terrain vehicles are typically configured as four-wheel drive (4 WD) vehicles having large tires and large amounts of suspension travel that allow such vehicles to negotiate rough terrain and fit on trails that on-road vehicles may not be able to traverse. Such engine layouts and vehicle configurations may result in a rear biased and a relatively high center of gravity (CG) location, which result in driving characteristics that may not be preferable to all drivers.

SUMMARY

In various embodiments the present disclosure provides a light weight off-road vehicle, e.g., an all-terrain side-by-side vehicle or utility task vehicle, that includes a chassis, a pair of front wheels, an a pair of rear wheels operationally connected to the chassis and a passenger compartment supported by the chassis. The passenger compartment generally includes a dash console, a floorboard, and a passenger seating structure. The vehicle additionally includes a drivetrain operatively connected to at least one of the wheels and generally comprising at least one drive shaft, and at least one torque transfer device, e.g., at least one transmission and/or transaxle. Furthermore the vehicle includes a prime mover, e.g., an internal combustion engine, that is mounted to the chassis forward of the seating structure and operatively connected to the drivetrain. The prime mover is structured and operable to provide motive force to at least one of the wheels. In various instances the prime mover is mounted to the chassis such that it has a longitudinal orientation relative to a longitudinal axis of the vehicle. Additionally, in various instances wherein the torque transfer device is a transmission, the transmission is mounted such that it has a longitudinal orientation relative to the longitudinal axis of the vehicle.

By locating the prime mover in front of the passengers, the center of gravity of the vehicle is located further forward than known such vehicles, e.g., further toward the front of the vehicle than known such vehicles. This results in improved and stable vehicle handling dynamics. More particularly, placement of the prime mover forward of the seating structure increases the mass moment of inertia of the vehicle in both pitch and yaw which results in improved pitch and yaw stability and suspension isolation while traversing rough terrain. These resulting handling characteristics may be preferable to some drivers over the characteristics of known such vehicle having a rear mounted engine position. Another advantage of locating the prime mover forward of the seating structure is that the rearward portion of the vehicle, e.g., the portion of the vehicle behind the seating structure, is absent the prime mover. Therefore, the vehicle has more space behind the seating structure that allows for greater rear storage volume and payload than known such vehicles, e.g., the vehicle can have a larger cargo bed with greater volume than known such vehicles. Moreover, the additional space created by placing the prime mover forward of the seating structure allows for such a cargo bed of the vehicle to have a greater depth and sit lower to the ground than known light weight off-road vehicles, e.g., the bottom or deck of the cargo bed can be located lower toward the ground and in closer proximity to rear axle(s) of the vehicle than known such vehicles. By being able to locate the cargo bed lower to the ground the vehicle can have a lower center of gravity, and hence greater stability and handling dynamics, than known such vehicles, particularly when the cargo bed of such vehicles is loaded with cargo. Still further, the additional space in the rear portion of the vehicle can provide greater seating capacity than known light weight off-road vehicles, e.g., additional space for a second row seat or seats.

Other embodiments, aspects, and advantages will become apparent from the following detailed description taken in conjunction with the accompanying drawings which illustrate, by way of example, the principles of the described embodiments. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

Figure 1A:
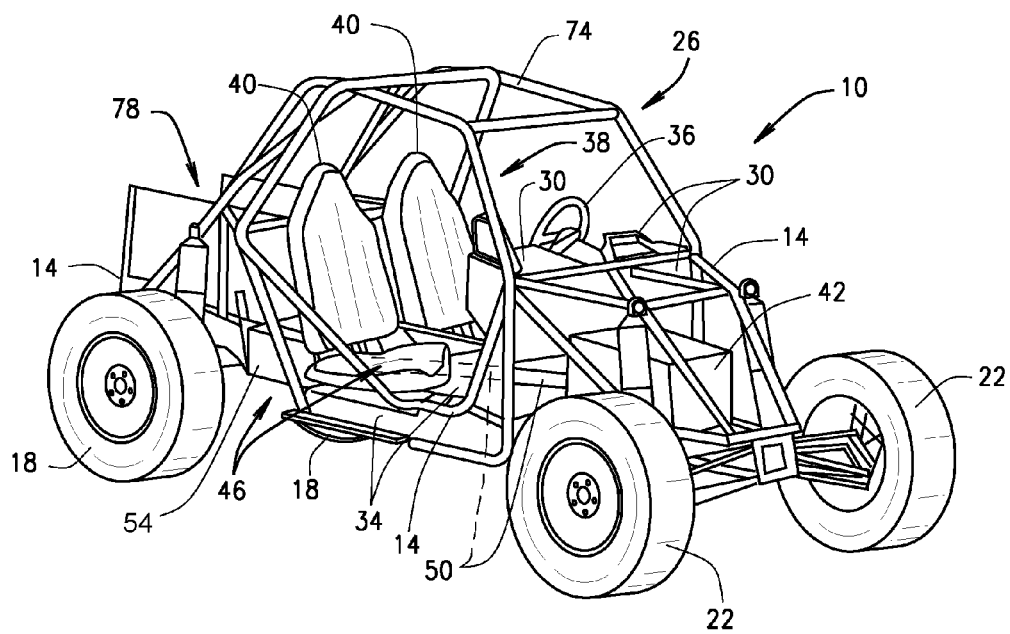
FIG. 1A is an isometric view of an off-road, all-terrain vehicle having a prime mover mounted forward of a seating structure of the vehicle, in accordance with various embodiments of the present disclosure.

The following description is merely exemplary in nature and is in no way intended to limit the present teachings, application, or uses. Throughout this specification, like reference numerals will be used to refer to like elements.

The embodiments disclosed below are not intended to be exhaustive or to limit the invention to the precise forms disclosed in the following detailed description. Rather, the embodiments are chosen and described so that others skilled in the art can utilize their teachings. While the present disclosure is primarily directed to an all-terrain, off-road utility vehicle, it should be understood that the features disclosed herein can have application to other types of vehicles such as most lightweight vehicles that are not designated for use on roadways, e.g., maintenance vehicles, cargo vehicles, shuttle vehicles, golf carts, other all-terrain vehicles (ATVs), utility task vehicles (UTVs), recreational off-highway vehicles (ROVs), side-by-side vehicles (SSV), worksite vehicles, buggies, motorcycles, watercraft, snowmobiles, tactical vehicles, etc.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. Similarly, when an element, object, device, apparatus, component, region or section, etc., is referred to as being "operably or "operatively connected to or engaged with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items.

As used herein the term "drivetrain" will be understood to mean the group of components that deliver torque to at least one of the wheels described below, excluding the prime mover described below that generates torque to provide motive force to the vehicle.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and nonlimiting.

Figure 1B:
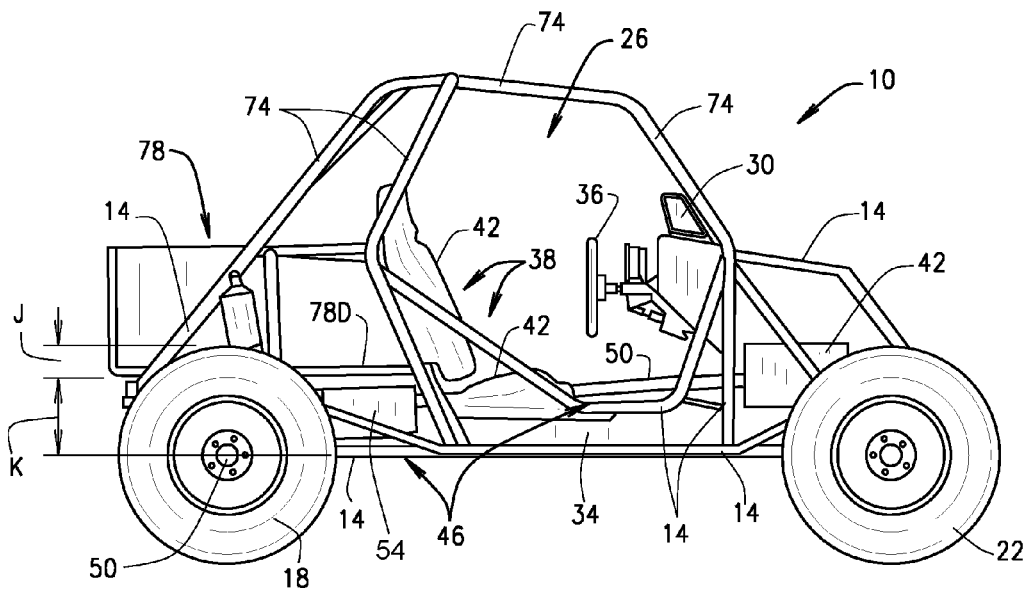
FIG. 1B is a side view of the vehicle shown in FIG. 1A, in accordance with various embodiments of the present disclosure.

Referring to FIGS. 1A and 1B, in various embodiments, the present disclosure provides a light weight off-road vehicle 10 that generally includes a chassis or frame 14, a pair of rear wheels 18 and a pair of front wheels 22 operationally connected to the chassis 14, and a passenger compartment 26. The vehicle 10 can be any four-wheel drive or two-wheel drive lightweight vehicle that is not designated for use on roadways. For example, the vehicle 10 can be an all-terrain side-by-side vehicle, a utility vehicle, a maintenance vehicle, a cargo vehicle, a shuttle vehicle, a golf car, a utility terrain vehicle, a utility task vehicle, a recreational off highway vehicle, a worksite vehicle, a buggy, or any other lightweight vehicle. Additionally, it is envisioned that in various embodiments, the vehicle 10 can be a lightweight tactical vehicle suitable for military, urban tactical patrol and security/border patrol applications. In such embodiments the chassis 14 and other components of the vehicle 10 can be constructed of high strength materials, additional protective panels, plates and structural reinforcements can be added to the vehicle body, and other strength, durability and protective features can be added to make the vehicle 10 suitable for military use. Further, such lightweight tactical vehicles may have characteristics, such as lighter weight and reduced footprint that may make it more desirable for use in certain applications than traditional larger, heavier weight military, urban tactical patrol, and security/border patrol vehicles, such as Humvees, full scale personnel transport vehicles, tanks, armored assault vehicles, etc.

As used herein, the word "wheel(s)" will be understood to mean the structure consisting of the respective tire mounted on the respective wheel, also known as the rim, particularly, the compilation of the tire and wheel/rim.

The passenger compartment 26 generally includes a dash console 30, a floorboard 34, and a passenger seating structure 38. The dash console 30 can include one or more instrument displays, gauges, vehicle control devices and/or storage compartments, e.g., an On/Off key switch, a forward/neutral/reverse selector, one or more small accessory storage pockets, one or more telemetry gauges/readouts (e.g., a speedometer, tachometer, temperature gauge, etc.) an electronic display (e.g., an LCD display that can have touch capabilities), a radio, and/or various other vehicle controls. The floorboard 34 is structured and operable to enclose a bottom of, and provide a floor for, the passenger compartment 26. The seating structure 38 is structured and operable to provide seating for one or more vehicle occupants, e.g., a driver and one or more passengers. The seating structure 38 can include one or more seats 40, for example, in various embodiments the seating structure 38 can be a side-by-side seating structure comprising a single row of two or more laterally spaced (with regard to a longitudinal axis of the vehicle 10) separate and independent seats 40. Alternatively, the seating structure 38 can comprise a single row bench seat 40 capable of seating two or more passengers side-by-side, two rows of bench seats 40, or two rows of side-by-side seats 40 comprising four or more separate and independent seats 40, etc. The passenger compartment 26 additionally includes a steering wheel 36 for use by the vehicle operator to control the directional movement of the vehicle 10, a brake pedal 32 for use by the vehicle operator to control slowing and stopping of the vehicle 10 (shown in FIG. 7), and an accelerator pedal 33 for use by the vehicle operator to control the torque delivered by the prime mover(s) 42 (described below) to one or more of the rear and/or front wheels 18 and/or 22.

The vehicle 14 additionally includes a prime mover 42, e.g., an internal combustion engine (ICE), operatively connected to a drivetrain 46 that is operatively connected to at least one of the rear and/or front wheels 18 and/or 22. The prime mover 42 is structured and operable to generate torque (e.g., motive force, e.g., power) utilized to provide motive force for the vehicle 10 via the drivetrain, as described herein. Although the prime mover 42 is primarily described herein as an ICE, it should be understood that the prime mover 42 can be an electric motor, a hybrid combination of an ICE and an electric motor, or any other suitable motor or engine and remain within the scope of the present disclosure. In embodiments in which the prime mover 42 is embodied as or comprises an ICE (e.g., in a hybrid combination), the ICE can be configured to utilize any suitable combustible fuel, such as gasoline, diesel, natural gas, biofuel, some combination thereof, etc.

Importantly, the prime mover 42 is mounted to the chassis 14 forward of the seating structure 38. In this regard, the entire prime mover 42 can be mounted forward of a forward edge of the seating structure 38 such that a rearward most point of the prime mover 42 is forward of the forward most edge of the seating structure 38. As used herein, the word "forward" and the phase "forward of" are used to describe the direction from a named component or structure toward the front of the vehicle 10. For example, the statement that the prime mover 42 is mounted to the chassis 14 "forward of" the seating structure 38 means the prime mover 42 is mounted to the chassis 14 within an area that extends from the portion of the chassis 14 adjacent a front edge of the seating structure 38 (e.g., adjacent the front edge of a bottom portion of the seat(s) 40) to the front of the chassis 14 at the front of the vehicle 10 adjacent the front wheels 22. Similarly, as used herein, the word "rearward" and the phase "rearward of" are used to describe the direction from a named component or structure toward the rear of the vehicle 10. For example, the statement that a cargo bed is mounted to the chassis 14 "rearward of" the seating structure 38 means the cargo bed is mounted to the chassis 14 within an area that extends from the portion of the chassis 14 adjacent a rear edge of the seating structure 38 (e.g., adjacent the rear edge of the bottom portion of the seat(s) 40) to the rear of the chassis 14 at the rear of the vehicle 10 adjacent the rear wheels 18.

By having the prime mover 42 mounted to the chassis 14 forward of the seating structure 38, the center of gravity (CG) of the vehicle 10 is located further forward in the vehicle 10 than known light weight off-road vehicles, thereby improving the stability of the vehicle 10. Moreover, by having the prime mover 42 mounted to the chassis 14 forward of the seating structure 38 the mass moment of inertia of the vehicle for both pitch and yaw is increased. This results in improved pitch and yaw stability, improved suspension isolation (e.g., ability of the vehicle suspension to isolate the passenger(s) from rough terrain), and decreased driver workload while traversing rough terrain. Still further, as described further below, by mounting the prime mover 42 mounted to the chassis 14 forward of the seating structure 38 there is more space in the rear area of the vehicle 10 than known light weight off-road vehicles, thereby allowing for improved seating space for passengers, and increased storage volume and payload, e.g., as described below, a cargo bed 78 can be structured to be deeper and have a larger volume than known light weight off-road vehicle cargo beds.

Furthermore, in various embodiments, the prime mover 42 is mounted forward of the seating structure 38 having a longitudinal orientation with regard to a longitudinal axis A of the vehicle 10. That is, as illustrated by way of example in FIGS. 2 through 6, in various embodiments, the prime mover 42 is mounted to the chassis 14 such that a longitudinal axis M of the prime mover 42 is substantially parallel with the longitudinal axis A of the vehicle 14. However, it is also envisioned that in various embodiments the prime mover 14 can be mounted to have a transverse or lateral orientation, with regard the vehicle axis A.

The drivetrain 46 generally includes at least one drive shaft 50 and at least one torque transfer device 54. The drivetrain 46 additionally includes at least one rear axle 58 (shown in FIGS. 2 through 6) and/or at least one front axle 62 (shown in FIGS. 2 through 6). The rear and/or front axle(s) 58 and/or 62 can be either a split axle for an independent suspension system, or a one-piece axle. In various embodiments, the drivetrain 46 can further include a rear differential (shown in FIGS. 3, 4, 5 and 6) and/or a front differential (shown in FIGS. 2, 3, 4 and 5). The torque transfer device(s) 54 can be any device(s) structured and operable to transfer and distribute torque generated by the prime mover 42 to at least one of a rear differential (described below), a front differential (described below), the rear axle(s) 58 and/or the front axle(s) 62. For example, in various embodiments, the torque transfer device(s) 54 can comprise one or more transmission (e.g., one or more geared or continuously variable transmission) and/or one or more transaxle. The at least one drive shaft 50 is structured and operable to convey torque from a first component (e.g., from the prime mover 42 or the torque transfer device 54) operably connected at a first end of the respective drive shaft 50 to a second component (e.g., to the torque transfer device 54, a rear differential, or a front differential) operably connected to an opposing second end of the respective drive shaft 50.

In various embodiments, the vehicle 10 further includes a roll over protection structure (ROPS) 74 that is disposed above and around at least a portion of the passenger compartment 26 and is structured and operable to protect passengers within the passenger compartment 26 in a situation where the vehicle 10 may be caused to overturn, flip or roll over. The ROPS 74 comprises a plurality of tubes, bars or beams that are connected to the chassis 14 and extend above, over and around at least a portion of the passenger compartment 26. The ROPS 74 can be constructed or fabricated of any material having sufficient strength and rigidity to provide protection to the passengers of the vehicle 10 should the vehicle 10 be upset and turned on its side, flipped or rolled over, e.g., high strength steel, aluminum, titanium, carbon fiber, etc.

In various embodiments, the vehicle 10 further includes a cargo bed 78. The cargo bed 78 is structured and operable for hauling various payloads such as coolers, personal gear, tools, gravel, rock, soil, debris, garbage, wood, etc., and/or large tools and equipment such as shovels, rakes, wheelbarrows, lawn mowers, chain saws, other motorized equipment, etc. In various implementations, the cargo bed 78 can be a fixed or stationary bed, wherein the cargo bed 78 is fixedly connected to a chassis 14 and/or other frame structure of the vehicle 10, while in other implementations the cargo bed 78 can be a lift or dump bed, wherein the vehicle 10 can include a lift mechanism (not shown) that is operable to lift a front portion of the cargo bed 78 (i.e., the portion of the cargo bed 78 nearest the passenger compartment 26) in order to dump or easily extract items or materials from the cargo bed 78.

Referring now to FIGS. 2 through 6, as described above, by mounting the prime mover 42 to the chassis 14 forward of the seating structure 38 additional space is provided in the rear area of the vehicle 10. Particularly, the additional space allows for more flexibility in the configuration and layout of the drivetrain 46 of the vehicle 10 than in known light weight off-road vehicles.

Figure 2:
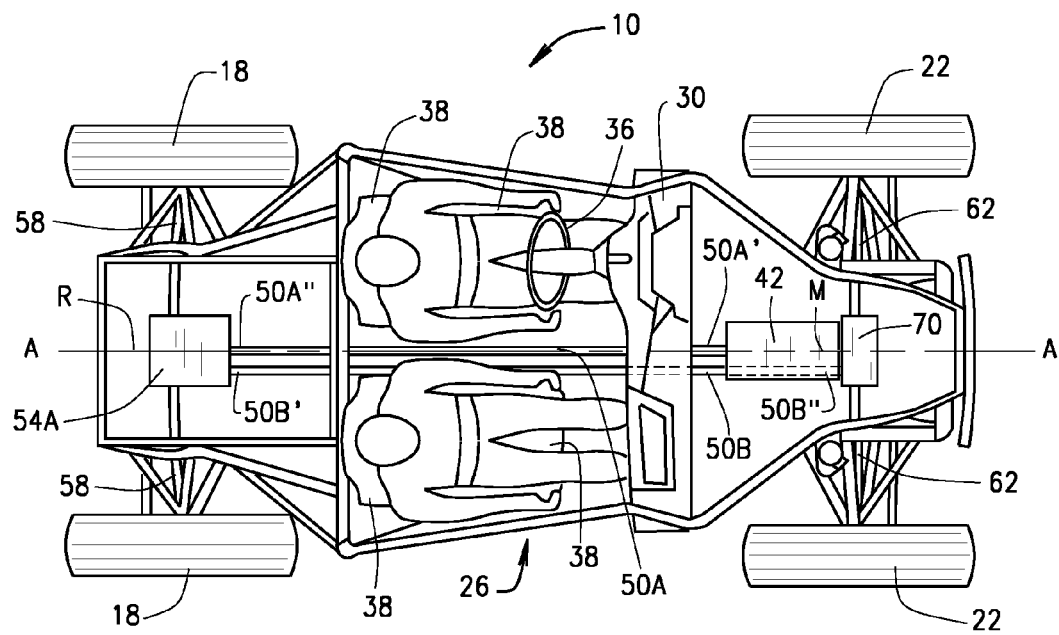
FIG. 2 is a schematic drawing of the vehicle shown in FIGS. 1A and 1B having a drivetrain configuration in accordance with various embodiments of the present disclosure.

For example, as illustrated in FIG. 2, in various embodiments, the torque transfer device 54 of the drivetrain 46 can comprise a transaxle (identified by the reference numeral 54A) and the one or more drive shafts 50 comprise a rear driveshaft (identified by the reference numeral 50A) and, in various implementations, a front driveshaft (identified by the reference numeral 50B). The transaxle 54A is disposed (e.g., mounted at least partially to the chassis 14) rearward of the seating structure 38, between the rear wheels 18, and is operably connected to at least one rear wheel 18 via at least one rear axle 58. The rear drive shaft 50A is operably connected to the prime mover 42 at first end 50A', extends rearward from the prime mover 42, and is operably connected to the transaxle 54A at an opposing second end 50A". Accordingly, torque (e.g., motive force, e.g., power) generated by the prime mover 42 is transferred to the transaxle 54A via the rear drive shaft 50A, and the torque received and output by the transaxle 54A is transferred to at least one rear wheel 18 via a respective rear axle 58.

In implementations including the front drive shaft 50A (e.g., four-wheel drive implementations), the transaxle 54A can include a power take off (PTO) unit (not shown), whereby the front drive shaft 50B is operably connected at a first end 50B' to the transaxle 54A. The front drive shaft 50B extends forward from the transaxle 54A and is operably connected at an opposing second end 50B" to a front differential 70 that is operably connected to at least one front wheel 22 via at least one front axle 62. Accordingly, torque received by the transaxle 54A, as described above, is transferred to the front differential 70 via the front drive shaft 50B, whereby the torque output by the front differential 70 is transferred to at least one front wheel 22 via a respective front axle 62.

In various implementations, the transaxle 54A can be a low-profile transaxle implemented to provide additional space at the rear area of the vehicle 10, thereby further allowing for increased storage volume and payload, e.g., as described below, the cargo bed 78 can be structured to be deeper and have a larger volume than known light weight off-road vehicle cargo beds.

It should be noted that in such embodiments, the drivetrain 46 can further include one or more clutches (not shown) (e.g., fluid couplings and/or passive clutches and/or active clutches) that is/are structured and operable to controllably engage and disengage the prime mover 42 and/or the transaxle 54A and/or the front differential 70 from the respective rear and/or front drive shaft(s) 50A and/or 50B such that torque can be controllably delivered to the transaxle 54A and/or the front differential 70.

Furthermore, in various embodiments, the transaxle 54A is mounted rearward of the seating structure 38 having a longitudinal orientation with regard to a longitudinal axis A of the vehicle 10. That is, as illustrated by way of example in FIG. 2, in various embodiments, the transaxle 54A is mounted such that a longitudinal axis R of the transaxle 54A is substantially parallel with the longitudinal axis A of the vehicle 14. However, it is also envisioned that in various embodiments the transaxle 54A can be mounted to have a transverse or lateral orientation, with regard the vehicle axis A.

It is envisioned that in all instances described herein the transaxle 54A can be an 'automatic' transaxle structured and operable to automatically switch between gears, a 'manual' transaxle wherein the vehicle operator manually shifts between gears via a manual gear shifting device (not shown) (e.g., a gear shift lever, a plurality of gear shift buttons, etc.), or any combination thereof (e.g., a semi-automatic/manunmatic transaxle).

In various implementations, the transaxle 54A can be a multi-speed transaxle that includes an extremely low first gear, sometimes referred to as a 'granny gear'. As used herein a granny gear should be understood to mean an extremely low first gear that provides a very low gear reduction that can be used when extra torque is needed from the prime mover 42 and transaxle 54A to propel the vehicle 10. For example, the granny gear can be utilized when the vehicle 10 is used to pull or tow a heavy object at a low speed pulling, or when the vehicle 10 is traversing a steep incline, or when it is desired that the vehicle 10 move only a very slow speed (sometimes referred to as crawling). In such instances, the transaxle 54A can be a fully automatic transaxle structured and operable to automatically switch between all gears (including the granny gear). Alternatively, in various other instances the transaxle 54A can be a combination automatic and manual transaxle, wherein during normal driving operation (e.g., when use of the granny gear is not needed), the transaxle 54A is structured and operable to automatically switch gears, and when use of the granny gear is needed engagement of the granny gear can be accomplished by manual manipulation of a granny gear selection device (not shown) by the vehicle operator (e.g., manual manipulation of a button, switch, lever, input to a mode selection on a touch screen display, etc.). Yet, in various other instances, the transaxle 54A can be a 'manual' transaxle, wherein the vehicle operator manually shifts between all gears (including the granny gear) via a manual gear shifting device (not shown) (e.g., a gear shift lever, a plurality of gear shift buttons, etc.).

Figure 3:
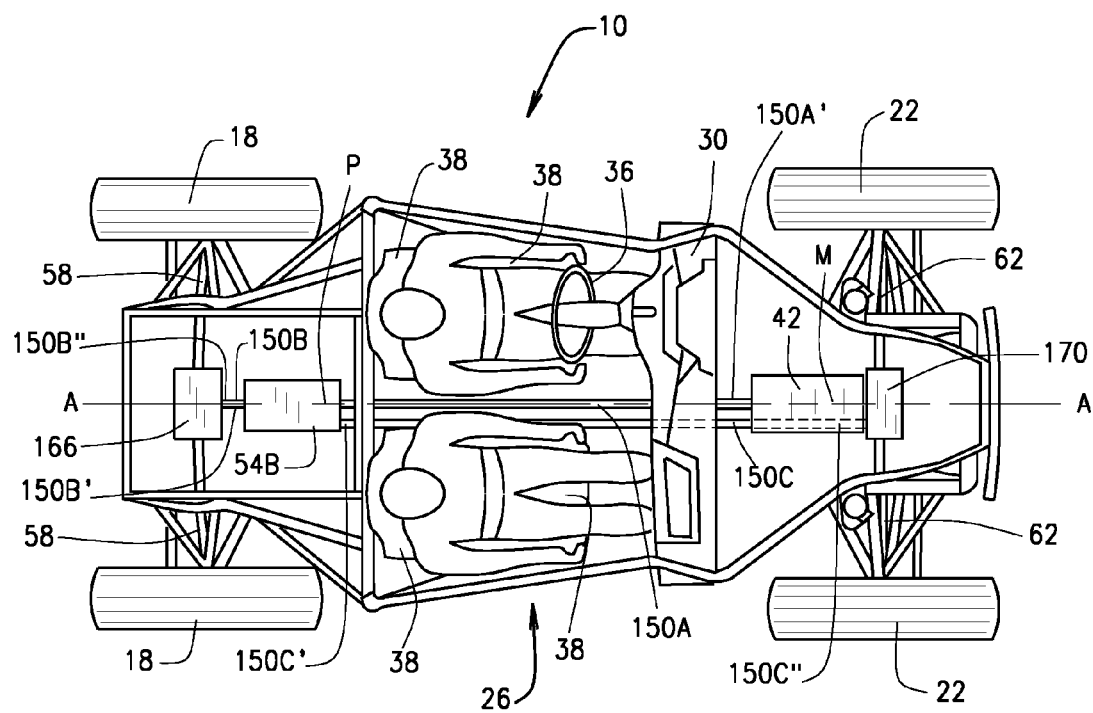
FIG. 3 is a schematic drawing of the vehicle shown in FIGS. 1A and 1B having a drivetrain configuration in accordance with various other embodiments of the present disclosure.

As another example, as illustrated in FIG. 3, in various other embodiments, the torque transfer device 54 of the drivetrain 46 can comprise a transmission (identified by the reference numeral 54B) and the one or more drive shafts 50 comprise a primary rear driveshaft (identified by the reference numeral 150A). In various implementations, the drive shaft(s) 50 can additionally include a secondary rear drive shaft (identified by reference numeral 150B) and/or a front driveshaft (identified by the reference numeral 150C). In such embodiments, the drivetrain 46 can further include a rear differential 166 and/or a front differential 170. The rear differential 166 is operably connected to at least one rear wheel 18 via at least one rear axle 58. Similarly, the front differential 170 is operably connected to at least one front wheel 22 via at least one front axle 62. The transmission 54B is disposed (e.g., mounted at least partially to the chassis 14) rearward of the seating structure 38. The primary rear drive shaft 150A is operably connected to the prime mover 42 at first end 150A', extends rearward from the prime mover 42, and is operably connected to the transmission 54B at an opposing second end 150A". Accordingly, torque (e.g., motive force, e.g., power) generated by the prime mover 42 is transferred to the transmission 54B via the primary rear drive shaft 150A.

In implementations including the secondary rear drive shaft 150B (e.g., rear-wheel drive and four-wheel drive implementations), the secondary rear drive shaft 150B is operably connected to the transmission 54B at a first end 150B' and operably connected at an opposing second end 150B" to the rear differential 166 that is operably connected to at least one rear wheel 18 via at least one rear axle 58. Accordingly, torque received from the prime mover 42 and output by the transmission 54B is transferred to the rear differential 166 via the secondary rear drive shaft 150B, whereby the torque output by the rear differential 166 is transferred to at least one rear wheel 18 via at least one rear axle 58.

In implementations including the front drive shaft 150C (e.g., front-wheel drive and four-wheel drive implementations), the transmission 54B can include a power take off (PTO) (not shown), whereby the front drive shaft 150C is operably connected at a first end 150C' to the transmission 54B. The front drive shaft 150C extends forward from the transmission 54B and is operably connected at an opposing second end 150C" to a front differential 170 that is operably connected to at least one front wheel 22 via at least one front axle 62. Accordingly, torque received from the prime mover 42 and output by the transmission 54B is transferred to the front differential 170 via the front drive shaft 150C, whereby the torque output by the front differential 170 is transferred to at least one front wheel 22 via a respective front axle 62.

It should be noted that in such embodiments, the drivetrain 46 can further include one or more clutches (not shown) (e.g., fluid couplings and/or passive clutches and/or active clutches) that is/are structured and operable to controllably engage and disengage the prime mover 42 and/or the transmission 54B and/or the rear differential 166 and/or the front differential 170 from the respective primary rear drive shaft 150A and/or the secondary rear drive shaft 150B and/or the front drive shaft 150C such that torque can be controllably delivered to the transmission 54B and/or the rear differential 166 and/or the front differential 170.

Furthermore, in various embodiments, the transmission 54B is mounted rearward of the seating structure 38 having a longitudinal orientation with regard to a longitudinal axis A of the vehicle 10. That is, as illustrated by way of example in FIG. 3, in various embodiments, the transmission 54B is mounted such that a longitudinal axis P of the transmission 54B is substantially parallel with the longitudinal axis A of the vehicle 14. However, it is also envisioned that in various embodiments the transmission 54B can be mounted to have a transverse or lateral orientation, with regard the vehicle axis A.

It is envisioned that in all instances described herein the transmission 54B can be an 'automatic' transmission wherein during driving operation the transmission 54B is structured and operable to automatically switch between all gears, a 'manual' transmission wherein the vehicle operator manually shifts between gears via a manual gear shifting device (not shown) (e.g., a gear shift lever, a plurality of gear shift buttons, etc.), or any combination thereof (e.g., a semi-automatic/manunmatic transmission).

In various implementations, the transmission 54B can be a multi-speed transmission that includes an extremely low first gear, sometimes referred to as a 'granny gear'. As used herein a granny gear should be understood to mean an extremely low first gear that provides a very low gear reduction that can be used when extra torque is needed from the prime mover 42 and transmission 54B to propel the vehicle 10. For example, the granny gear can be utilized when the vehicle 10 is used to pull or tow a heavy object at a low speed pulling, or when the vehicle 10 is traversing a steep incline, or when it is desired that the vehicle 10 move only a very slow speed (sometimes referred to as crawling). In such instances, the transmission 54B can be a fully automatic transmission structured and operable to automatically switch between all gears (including the granny gear). Alternatively, in various other instances the transmission 54B can be a combination automatic and manual transmission, wherein during normal driving operation (e.g., when use of the granny gear is not needed), the transmission 54B is structured and operable to automatically switch gears, and when use of the granny gear is needed engagement of the granny gear can be accomplished by manual manipulation of a granny gear selection device (not shown) by the vehicle operator (e.g., manual manipulation of a button, switch, lever, input to a mode selection on a touch screen display, etc.). Yet, in various other instances, the transmission 54B can be a 'manual' transmission, wherein the vehicle operator manually shifts between all gears (including the granny gear) via a manual gear shifting device (not shown) (e.g., a gear shift lever, a plurality of gear shift buttons, etc.).

Figure 4:
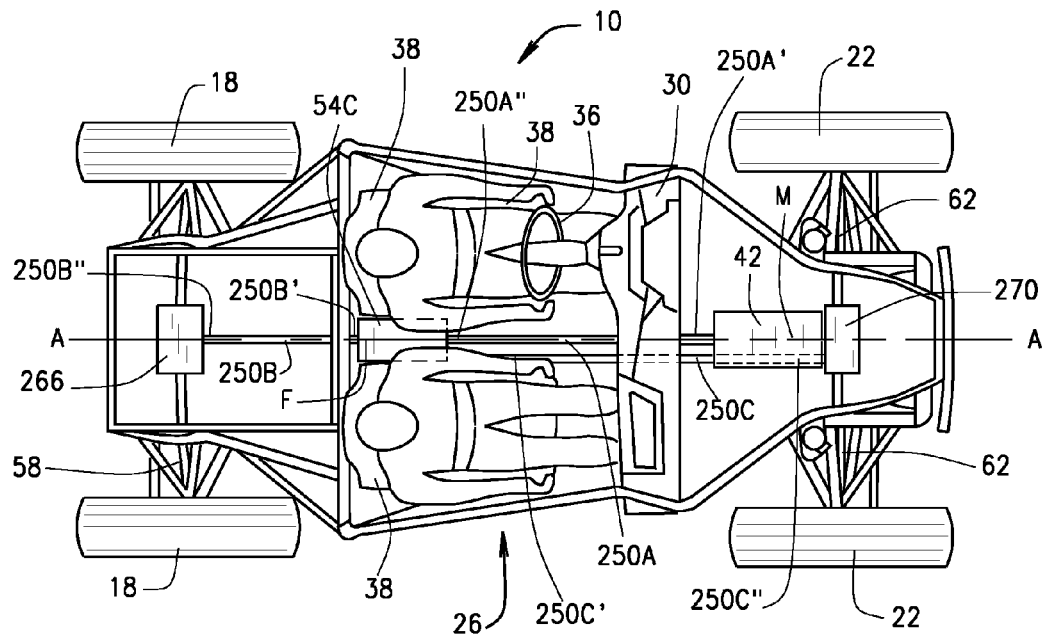
FIG. 4 is a schematic drawing of the vehicle shown in FIGS. 1A and 1B having a drivetrain configuration in accordance with yet various other embodiments of the present disclosure.

As yet another example, as illustrated in FIG. 4, in yet various other embodiments, the torque transfer device 54 of the drivetrain 46 can comprise a transmission (identified by the reference numeral 54C) and the one or more drive shafts 50 comprise a primary rear driveshaft (identified by the reference numeral 250A). In various implementations, the drive shaft(s) 50 can additionally include a secondary rear drive shaft (identified by reference numeral 250B) and/or a front driveshaft (identified by the reference numeral 250C). In such embodiments, the drivetrain 46 can further include a rear differential 266 and/or a front differential 270. The rear differential 266 is operably connected to at least one rear wheel 18 via at least one rear axle 58. Similarly, the front differential 270 is operably connected to at least one front wheel 22 via at least one front axle 62. The transmission 54C is mid-mounted (e.g., mounted at least partially to the chassis 14) such that the transmission 54C is disposed at least partially beneath the seating structure 38. The primary rear drive shaft 250A is operably connected to the prime mover 42 at first end 250A', extends rearward from the prime mover 42, and is operably connected to the transmission 54B at an opposing second end 250A". Accordingly, torque (e.g., motive force, e.g., power) generated by the prime mover 42 is transferred to the transmission 54C via the primary rear drive shaft 250A.

In implementations including the secondary rear drive shaft 250B (e.g., rear-wheel drive and four-wheel drive implementations), the secondary rear drive shaft 250B is operably connected to the transmission 54B at a first end 250B' and operably connected at an opposing second end 250B" to the rear differential 266 that is operably connected to at least one rear wheel 18 via at least one rear axle 58. Accordingly, torque received from the prime mover 42 and output by the transmission 54C is transferred to the rear differential 266 via the secondary rear drive shaft 250B, whereby the torque output by the rear differential 266 is transferred to at least one rear wheel 18 via at least one rear axle 58.

In implementations including the front drive shaft 250C (e.g., front-wheel drive and four-wheel drive implementations), the transmission 54C can include a power take off (PTO) (not shown), whereby the front drive shaft 250C is operably connected at a first end 250C' to the transmission 54B. The front drive shaft 250C extends forward from the transmission 54C and is operably connected at an opposing second end 250C" to a front differential 270 that is operably connected to at least one front wheel 22 via at least one front axle 62. Accordingly, torque received from the prime mover 42 and output by the transmission 54C is transferred to the front differential 270 via the front drive shaft 250C, whereby the torque output by the front differential 270 is transferred to at least one front wheel 22 via a respective front axle 62.

It should be noted that in such embodiments, the drivetrain 46 can further include one or more clutches (not shown) (e.g., fluid couplings and/or passive clutches and/or active clutches) that is/are structured and operable to controllably engage and disengage the prime mover 42 and/or the transmission 54C and/or the rear differential 266 and/or the front differential 270 from the respective primary rear drive shaft 250A and/or the secondary rear drive shaft 250B and/or the front drive shaft 250C such that torque can be controllably delivered to the transmission 54C and/or the rear differential 266 and/or the front differential 270.

Furthermore, in various embodiments, the transmission 54C is mid-mounted having a longitudinal orientation with regard to a longitudinal axis A of the vehicle 10. That is, as illustrated by way of example in FIG. 4, in various embodiments, the transmission 54C is mounted such that a longitudinal axis F of the transmission 54C is substantially parallel with the longitudinal axis A of the vehicle 14. However, it is also envisioned that in various embodiments the transmission 54C can be mounted to have a transverse or lateral orientation, with regard the vehicle axis A.

It is envisioned that in all instances described herein the transmission 54C can be an 'automatic' transmission wherein during driving operation the transmission 54C is structured and operable to automatically switch between all gears, a 'manual' transmission wherein the vehicle operator manually shifts between gears via a manual gear shifting device (not shown) (e.g., a gear shift lever, a plurality of gear shift buttons, etc.), or any combination thereof (e.g., a semi-automatic/manunmatic transmission).

In various implementations, the transmission 54C can be a multi-speed transmission that includes an extremely low first gear, sometimes referred to as a 'granny gear'. As used herein a granny gear should be understood to mean an extremely low first gear that provides a very low gear reduction that can be used when extra torque is needed from the prime mover 42 and transmission 54C to propel the vehicle 10. For example, the granny gear can be utilized when the vehicle 10 is used to pull or tow a heavy object at a low speed pulling, or when the vehicle 10 is traversing a steep incline, or when it is desired that the vehicle 10 move only a very slow speed (sometimes referred to as crawling). In such instances, the transmission 54C can be a fully automatic transmission structured and operable to automatically switch between all gears (including the granny gear). Alternatively, in various other instances the transmission 54C can be a combination automatic and manual transmission, wherein during normal driving operation (e.g., when use of the granny gear is not needed), the transmission 54C is structured and operable to automatically switch gears, and when use of the granny gear is needed engagement of the granny gear can be accomplished by manual manipulation of a granny gear selection device (not shown) by the vehicle operator (e.g., manual manipulation of a button, switch, lever, input to a mode selection on a touch screen display, etc.). Yet, in various other instances, the transmission 54C can be a 'manual' transmission, wherein the vehicle operator manually shifts between all gears (including the granny gear) via a manual gear shifting device (not shown) (e.g., a gear shift lever, a plurality of gear shift buttons, etc.).

Figure 5:
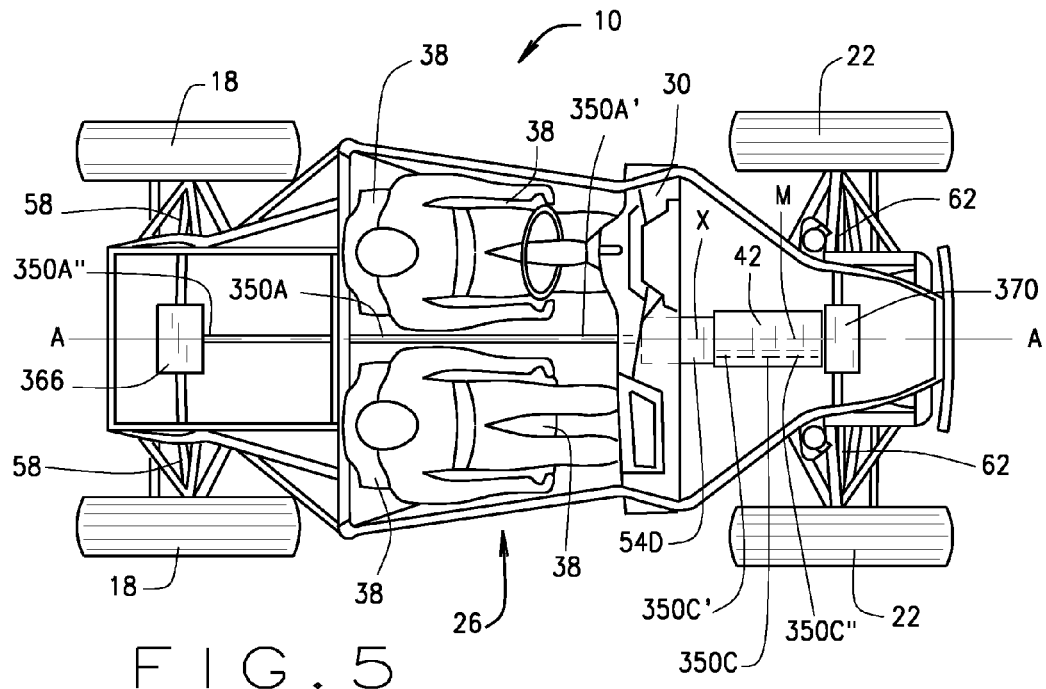
FIG. 5 is a schematic drawing of the vehicle shown in FIGS. 1A and 1B having a drivetrain configuration in accordance with still yet various other embodiments of the present disclosure.

As still yet another example, as illustrated in FIG. 5, in still yet various other embodiments, the torque transfer device 54 of the drivetrain 46 can comprise a transmission (identified by the reference numeral 54D) that is coupled directly to the rear of the prime mover 42. The one or more drive shafts 50 comprise a rear driveshaft (identified by the reference numeral 350A). In various implementations, the drive shaft(s) 50 can additionally include a front driveshaft (identified by the reference numeral 350B). In such embodiments, the drivetrain 46 can further include a rear differential 366 and/or a front differential 230. The rear differential 366 is operably connected to at least one rear wheel 18 via at least one rear axle 58. Similarly, the front differential 370 is operably connected to at least one front wheel 22 via at least one front axle 62. The transmission 54D is mounted directly to the rear (e.g., the rearward end) of the prime mover 42 such that the transmission 54D is disposed at least partially forward of the seating structure 38. The rear drive shaft 350A is operably connected to the transmission 54D at first end 350A', extends rearward from the transmission 54D, and is operably connected to the rear differential 366 at an opposing second end 350A". Accordingly, torque (e.g., motive force, e.g., power) generated by the prime mover 42 is transferred directly to the transmission 54D, and then from the transmission 54D to the rear differential 366 via the rear drive shaft 350A.

In implementations including the front drive shaft 350B (e.g., front-wheel drive and four-wheel drive implementations), the transmission 54D can include a power take off (PTO) (not shown), whereby the front drive shaft 350B is operably connected at a first end 350B' to the transmission 54D. The front drive shaft 350B extends forward from the transmission 54D and is operably connected at an opposing second end 350B" to a front differential 370 that is operably connected to at least one front wheel 22 via at least one front axle 62. Accordingly, torque received from the prime mover 42 and output by the transmission 54D is transferred to the front differential 370 via the front drive shaft 350B, whereby the torque output by the front differential 370 is transferred to at least one front wheel 22 via a respective front axle 62.

It should be noted that in such embodiments, the drivetrain 46 can further include one or more clutches (not shown) (e.g., fluid couplings and/or passive clutches and/or active clutches) that is/are structured and operable to controllably engage and disengage the prime mover 42 and/or the transmission 54D and/or the rear differential 366 and/or the front differential 370 from the respective rear drive shaft 350A and/or the front drive shaft 250B such that torque can be controllably delivered to the transmission 54D and/or the rear differential 366 and/or the front differential 370.

Furthermore, in various embodiments, the transmission 54C is mounted at least partially forward of the seating structure 38 having a longitudinal orientation with regard to a longitudinal axis A of the vehicle 10. That is, as illustrated by way of example in FIG. 5, in various embodiments, the transmission 54D is mounted such that a longitudinal axis X of the transmission 54D is substantially parallel with the longitudinal axis A of the vehicle 14. However, it is also envisioned that in various embodiments the transmission 54D can be mounted to have a transverse or lateral orientation, with regard the vehicle axis A.

It is envisioned that in all instances described herein the transmission 54D can be an 'automatic' transmission wherein during driving operation the transmission 54D is structured and operable to automatically switch between all gears, a 'manual' transmission wherein the vehicle operator manually shifts between gears via a manual gear shifting device (not shown) (e.g., a gear shift lever, a plurality of gear shift buttons, etc.), or any combination thereof (e.g., a semi-automatic/manunmatic transmission).

In various implementations, the transmission 54D can be a multi-speed transmission that includes an extremely low first gear, sometimes referred to as a 'granny gear'. As used herein a granny gear should be understood to mean an extremely low first gear that provides a very low gear reduction that can be used when extra torque is needed from the prime mover 42 and transmission 54D to propel the vehicle 10. For example, the granny gear can be utilized when the vehicle 10 is used to pull or tow a heavy object at a low speed pulling, or when the vehicle 10 is traversing a steep incline, or when it is desired that the vehicle 10 move only a very slow speed (sometimes referred to as crawling). In such instances, the transmission 54D can be a fully automatic transmission structured and operable to automatically switch between all gears (including the granny gear). Alternatively, in various other instances the transmission 54D can be a combination automatic and manual transmission, wherein during normal driving operation (e.g., when use of the granny gear is not needed), the transmission 54D is structured and operable to automatically switch gears, and when use of the granny gear is needed engagement of the granny gear can be accomplished by manual manipulation of a granny gear selection device (not shown) by the vehicle operator (e.g., manual manipulation of a button, switch, lever, input to a mode selection on a touch screen display, etc.). Yet, in various other instances, the transmission 54D can be a 'manual' transmission, wherein the vehicle operator manually shifts between all gears (including the granny gear) via a manual gear shifting device (not shown) (e.g., a gear shift lever, a plurality of gear shift buttons, etc.).

Figure 6:
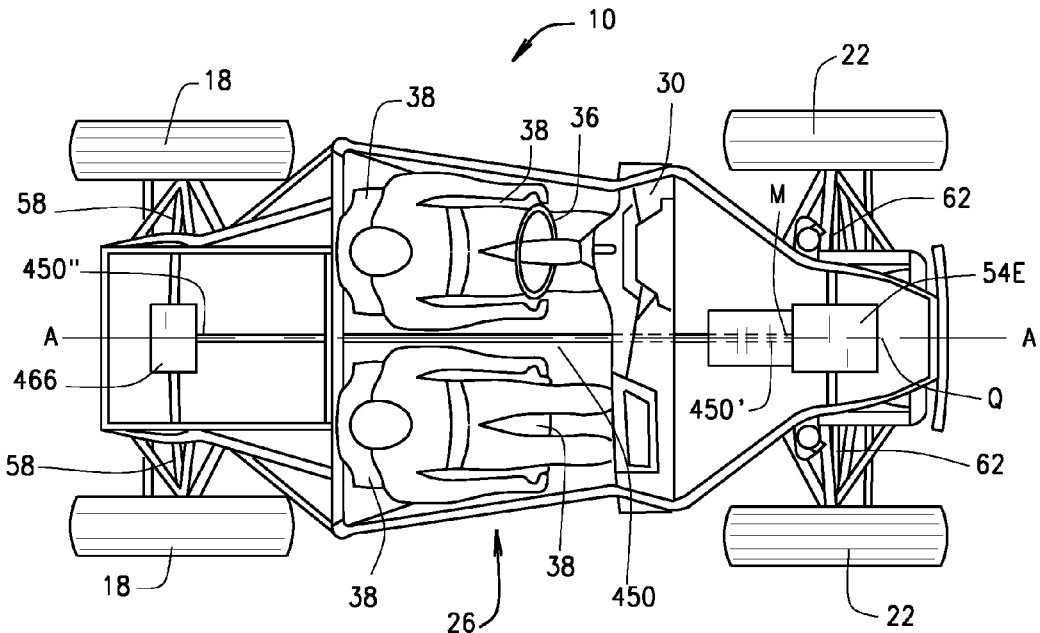
FIG. 6 is a schematic drawing of the vehicle shown in FIGS. 1A and 1B having a drivetrain configuration in accordance with yet further various other embodiments of the present disclosure.

As yet another example, as illustrated in FIG. 6, in yet further various other embodiments, the torque transfer device 54 of the drivetrain 46 can comprise a transaxle (identified by the reference numeral 54E) that is coupled directly to the front of the prime mover 42. The transaxle 54E is mounted directly to the front (e.g., the forward end) of the prime mover 42 such that the transaxle 54D is disposed forward of the seating structure 38, between the front wheels 22, and is operably connected to at least one front wheel 22 via at least one front axle 62. Accordingly, torque (e.g., motive force, e.g., power) generated by the prime mover 42 is transferred to the transaxle 54E via the direct connection thereto, and the torque received and output by the transaxle 54E is transferred to at least one front wheel 22 via a respective front axle 62.

In various implementation of such embodiments (e.g., four-wheel drive implementations), the drivetrain 46 can include a rear driveshaft (identified by the reference numeral 450) and a rear differential 466, and the transaxle 54E can include a power take off (PTO) (not shown), whereby the rear drive shaft 450 is operably connected at a first end 450' to the transaxle 54E. The rear differential 466 is operably connected to at least one rear wheel 18 via at least one rear axle 58. As described above, the rear drive shaft 450 is operably connected to the transaxle 54E at the first end 450'. The rear drive shaft 450 extends rearward from the transaxle 54E, and is operably connected to the rear differential 466 at an opposing second end 450". Accordingly, torque (e.g., motive force, e.g., power) generated by the prime mover 42 is transferred directly to the transaxle 54E, and then from the transaxle 54E to the rear differential 466 via the rear drive shaft 450.

It should be noted that in such embodiments, the drivetrain 46 can further include one or more clutches (not shown) (e.g., fluid couplings and/or passive clutches and/or active clutches) that is/are structured and operable to controllably engage and disengage the transaxle 54E and/or the rear differential 366 from the rear drive shaft 450 such that torque can be controllably delivered to the rear differential 466.

Furthermore, in various embodiments, the transaxle 54E is mounted forward of the seating structure 38 having a longitudinal orientation with regard to a longitudinal axis A of the vehicle 10. That is, as illustrated by way of example in FIG. 6, in various embodiments, the transaxle 54E is mounted such that a longitudinal axis Q of the transaxle 54E is substantially parallel with the longitudinal axis A of the vehicle 14. However, it is also envisioned that in various embodiments the transaxle 54E can be mounted to have a transverse or lateral orientation, with regard the vehicle axis A.

It is envisioned that in all instances described herein the transaxle 54E can be an 'automatic' transaxle structured and operable to automatically switch between gears, a 'manual' transaxle wherein the vehicle operator manually shifts between gears via a manual gear shifting device (not shown) (e.g., a gear shift lever, a plurality of gear shift buttons, etc.), or any combination thereof (e.g., a semi-automatic/manunmatic transaxle).

In various implementations, the transaxle 54E can be a multi-speed transaxle that includes an extremely low first gear, sometimes referred to as a 'granny gear'. As used herein a granny gear should be understood to mean an extremely low first gear that provides a very low gear reduction that can be used when extra torque is needed from the prime mover 42 and transaxle 54E to propel the vehicle 10. For example, the granny gear can be utilized when the vehicle 10 is used to pull or tow a heavy object at a low speed pulling, or when the vehicle 10 is traversing a steep incline, or when it is desired that the vehicle 10 move only a very slow speed (sometimes referred to as crawling). In such instances, the transaxle 54E can be a fully automatic transaxle structured and operable to automatically switch between all gears (including the granny gear). Alternatively, in various other instances the transaxle 54E can be a combination automatic and manual transaxle, wherein during normal driving operation (e.g., when use of the granny gear is not needed), the transaxle 54E is structured and operable to automatically switch gears, and when use of the granny gear is needed engagement of the granny gear can be accomplished by manual manipulation of a granny gear selection device (not shown) by the vehicle operator (e.g., manual manipulation of a button, switch, lever, input to a mode selection on a touch screen display, etc.). Yet, in various other instances, the transaxle 54E can be a 'manual' transaxle, wherein the vehicle operator manually shifts between all gears (including the granny gear) via a manual gear shifting device (not shown) (e.g., a gear shift lever, a plurality of gear shift buttons, etc.).

In the various embodiments described above, wherein the drivetrain 46 includes a front drive shaft, e.g., front drive shaft 50B, 150C, 250C, and 350B, and the respective torque transfer device, e.g., transaxle 54A, transmission 54B, transmission 54C and transmission 54D includes a PTO to transfer torque to one or more rear and/or front differentials, it is envisioned that in various implementations the PTO can be replaced by an additional center differential, whereby the respective front drive shaft can be rotated at a different rotational speed (RPM) than the respective rear drive shaft.

Furthermore, it is envisioned that in various embodiments wherein the prime mover 42 is an ICE, the ICE can be 'dry sump' engine to make the profile ICE smaller (e.g., make the height of the engine shorter), which allows for greater flexibility in the placement of the prime mover 42 within the vehicle 10, greater flexibility in the arrangement and configuration of the drivetrain 46. In this regard, for example, additional drivetrain components can be packaged in the front of the vehicle 10, which can create more space in the rear area of the vehicle 10 than known light weight off-road vehicles. As used herein, a 'dry sump' engine will be understood to be ICE not having a standard oil pan, oil pump and circulation system, but rather having only a notional oil pan for collecting oil for a scavenge pump, wherein the oil is pumped to and from a separate oil tank/reservoir.

Figure 7:
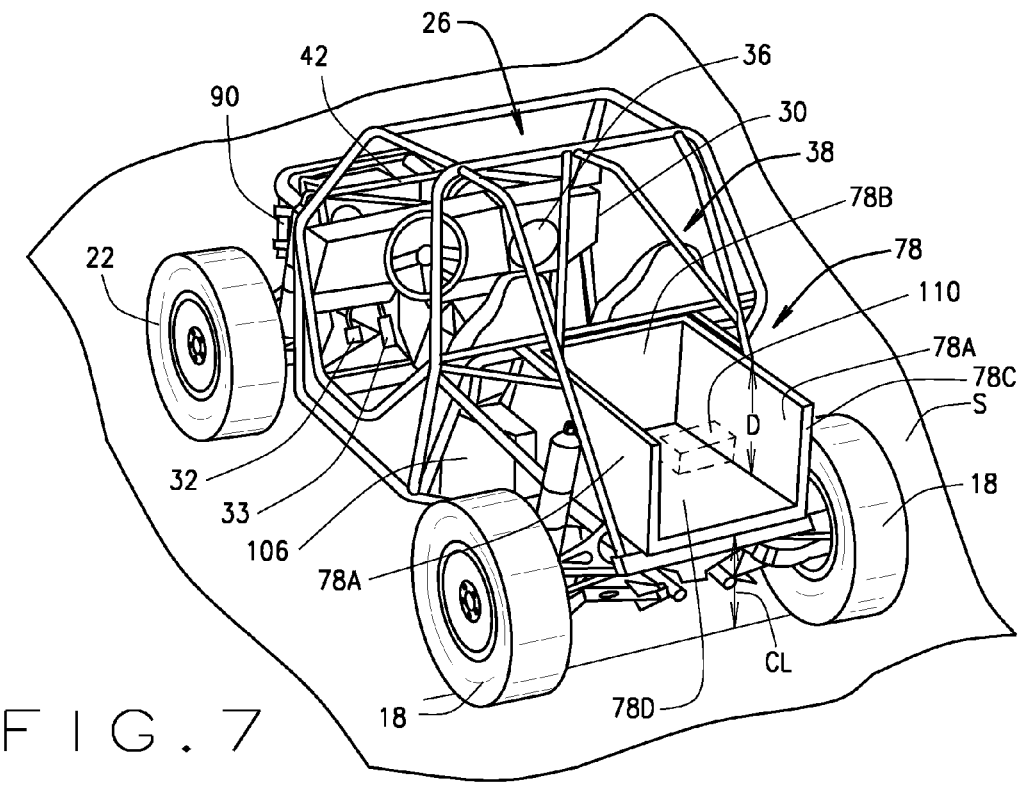
FIG. 7 is an isometric view of the vehicle shown in FIGS. 1A and 1B having a cargo bed with a deck that is disposed at a level that is lower than a top of the rear wheels of the vehicle, in accordance with various embodiments of the present disclosure.

Referring now to FIGS. 1A, 1B and 7, the cargo bed 78 of the vehicle 10 comprises a pair of opposing sidewalls 78A, a front wall 78B, a rear wall 78C and a deck 78D (e.g., a bottom or floor). In various implementations, the rear wall 78C can have an opening to allow access to the interior space of the bed 78 (as shown in FIG. 7), or can comprise one or more gates (or doors) that can be opened and closed to allow access to the interior space, or can comprise a solid panel such that the bed 78 can only be accessed by reaching over any of the sidewalls 78A, front wall 78B and rear wall 78C. As described above, the absence of the prime mover 42 behind or rearward of the seating structure 38 in the vehicle 10, particularly, mounting the prime mover 42 forward of the seating structure 38 in the vehicle 10, creates additional space behind or rearward of the seating structure 38 of the vehicle 10 that is not available in known light weight off-road vehicles that have rear mounted engines/motors. Also as described above, in the various drivetrain embodiments having a transaxle located rearward of the seating structure 38 (e.g., transaxle 54A), the transaxle can be a low-profile transaxle, thereby providing additional space behind or rearward of the seating structure 38. Taking advantage of the additional space, the cargo bed 78 of the vehicle 10 can be sized and shaped to have a larger dimensions and a greater volume than the cargo beds of known light weight off-road vehicles.

Particularly, in various embodiments, the cargo bed deck 78D can be disposed such that it is located closer to the ground and in closer proximity to rear axle(s) 58 than known light weight off-road vehicles. Therefore, the vehicle 10 can have a lower center of gravity, and hence greater stability and handling dynamics, than known light weight off-road vehicles. For example, in various implementations, as shown in FIG. 1B, the cargo bed 78 can be mounted to the chassis 14 such that deck 78D (particularly a bottom or underside face of the deck 78D) is disposed a distance K of approximately 8 to 14 inches, e.g., approximately 10 to 12 inches, above the bottom of the chassis 14 when the vehicle 10 is static, at rest, and not moving. As another example, in various implementations, as shown in FIG. 7, the cargo bed 78 can be mounted to the chassis 14 such that deck 78D (particularly the bottom or underside face of the deck 78D) is disposed to have ground clearance CL of approximately 18 to 30 inches, e.g., 21 to 27 inches, e.g., 23 to 25 inches. As used herein, ground clearance should be understood to mean the distance between a substantially flat surface S on which the vehicle 10 is setting (e.g., a substantially flat ground surface) and the bottom/underside face of the cargo bed deck 78D when the vehicle 10 is static, at rest, and not moving. As yet another example, in various implementations, as shown in FIG. 1B, the cargo bed 78 can be mounted to the chassis 14 such that deck 78D (particularly the bottom or underside face of the deck 78D) is disposed a distance J of approximately 0 to 10 inches, e.g., approximately 2 to 8 inches, e.g., approximately 4 to 6 inches lower than a top of rear wheels 18 when the vehicle 10 is static, at rest, and not moving.

In addition to the advantages of having a lower center of gravity, greater stability, and greater handling dynamics that are provided by having the cargo bed deck 78D disposed as described above, the cargo bed 78 can also have a depth D that is greater than the depth of known light weight off-road vehicles cargo beds. In this regard, the cargo bed 78 can have a depth D that is greater than the shallower depth of cargo beds in known light weight off-road vehicles, which are generally depth limited by a top of the rear mounted engine that is generally at least partially disposed underneath the bed in such known light weight off-road vehicles Therefore, the cargo bed 78 can have a greater volume, and hence a greater payload, than that of known light weight off-road vehicles.

Figure 8:
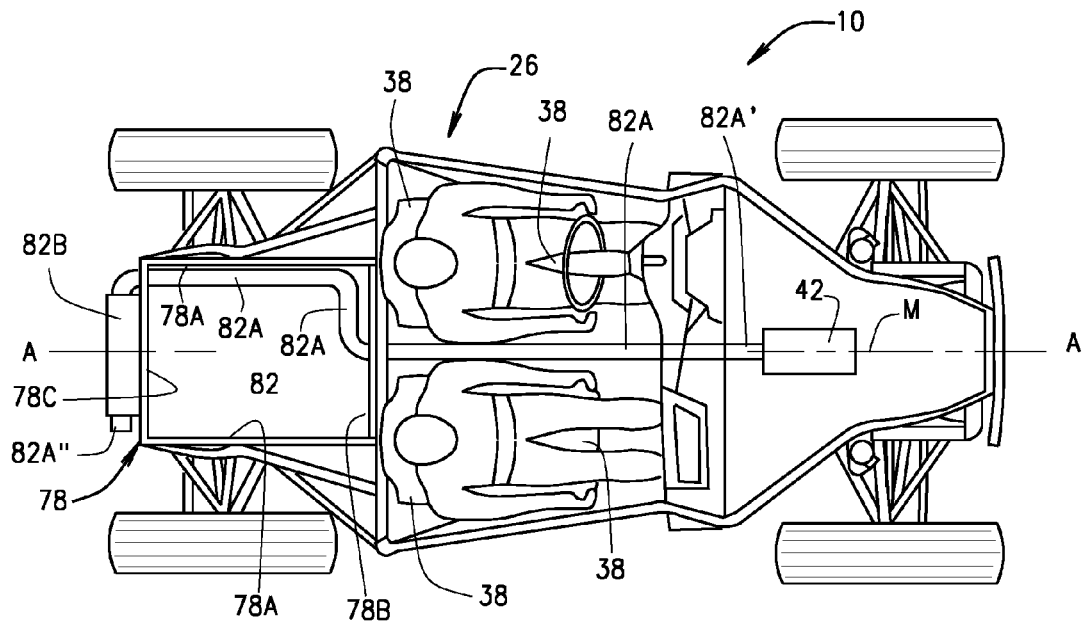
FIG. 8 is a schematic drawing of the vehicle shown in FIGS. 1A and 1B having an exhaust line configuration in accordance with various embodiments of the present disclosure.
Figure 9:
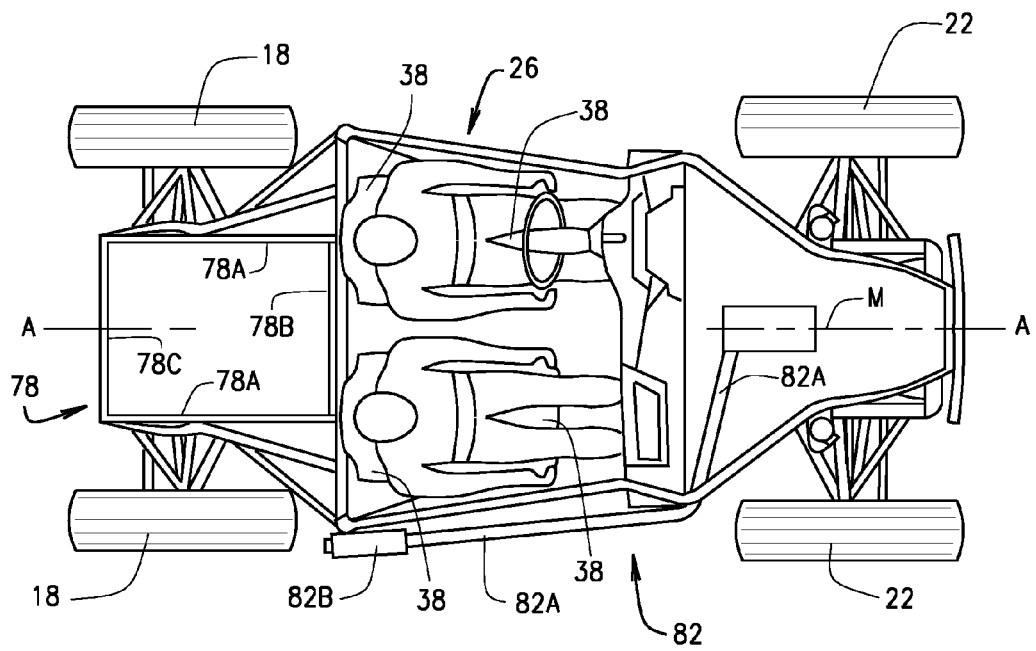
FIG. 9 is a schematic drawing of the vehicle shown in FIGS. 1A and 1B having an exhaust line configuration in accordance with various other embodiments of the present disclosure.

Referring now to FIGS. 8 and 9, in the various embodiments wherein the prime mover 42 is an ICE, the vehicle 10 further includes an exhaust line 82 that is structured and operable to convey and direct exhaust gases produced by the ICE away from passenger compartment 26. The exhaust line 82 generally includes one or more exhaust pipes 82A that are connected to form an exhaust gas conduit, wherein the conduit has an exhaust inlet end 82A' that is connected to the prime mover 42 (e.g., ICE) and an opposing exhaust outlet end 82A" that is disposed away from the passenger cabin 26. Accordingly, exhaust gases generated by the prime mover 42 are ported, or travel, through the conduit (e.g., through the pipe(s) 82A) and are exhausted (e.g., emitted, output or vented) away from the passenger cabin 26. In various implementations, the exhaust line 82 can additionally include a muffler 82B disposed approximate to, or integrated with, the exhaust outlet end 82A". The muffler 82B is structured and operable to muffle, e.g., reduce exhaust noise emitted by the prime mover 42. The exhaust line 82 can be laid out to have any desired path within the confines of the vehicle 10 from the prime mover 42 to the exhaust outlet end 82A".

For example, in various embodiments, the exhaust line 82 can extend rearward from the prime mover 42 under the passenger compartment 26, and at least a portion of the cargo bed 78, and terminate adjacent any one of the sidewalls 78A, front wall 78B, or rear wall 78D. For example, in various implementations, as illustrated in FIG. 8, at least a forward portion of the exhaust line 82 can extend rearward along a center line of the vehicle 10 (the center line being parallel with the longitudinal axis A) and under the passenger compartment 26 and seating structure 38. In such implementations, a rearward portion of the exhaust line can be disposed beneath the cargo bed 78 and terminate adjacent any one of the sidewalls 78A, front wall 78B, or rear wall 78D, e.g., adjacent the rear walls 78D.

As another example, in various embodiments, the exhaust line 82 can extend laterally from the prime mover 42, then run along an exterior edge of the vehicle 10 and terminate rearward of the passenger compartment 26, e.g., adjacent a rear boundary or wall of the passenger compartment 26 and/or adjacent any one of the sidewalls 78A, front wall 78B, or rear wall 78D. For example, in various implementations, as illustrated in FIG. 9, a forward portion of the exhaust line 82 can extend laterally from the prime mover 42 forward of the passenger compartment 26, then extend along or under a side or longitudinal boundary of the passenger compartment 26, and terminate behind the passenger compartment 26 adjacent the rear boundary or wall of the passenger compartment 26.

As described above, in the various embodiments wherein the torque transfer device comprises a transmission, e.g., transmission 54B, 54C and 54D, in various implementations of such embodiments, the respective transmission 54B, 54C and/or 54D can be disposed to have a longitudinal orientation. The longitudinal orientation of transmission(s) 54B, 54C and/or 54D allows for greater flexibility in the arrangement and configuration of the drivetrain 46, and can create more space in the rear area of the vehicle 10 than known light weight off-road vehicles. As described herein, the additional space created by the placement and orientation of the transmission(s) 54B, 54C and/or 54D, and/or the prime mover 42 allows for improved seating space for passengers, and increased storage volume and payload, e.g., the cargo bed 78 can be structured to be deeper and have a larger volume than known light weight off-road vehicle cargo beds (as described below).

Moreover, the longitudinal orientation of transmission(s) 54B, 54C and/or 54D allows for greater flexibility in the placement of the prime mover 42 within the vehicle 10. Particularly, although the embodiments set forth above describe the prime mover 42 as being located within the vehicle 10 forward of the seating structure 38, it is envisioned that, as a result of the longitudinal orientation of the transmission(s) 54B, 54C and/or 54D, the prime mover 42 can located anywhere within the respective drivetrain 46. For example, it is envisioned that in various implementations of such longitudinal oriented transmission embodiments, the prime mover 42 can be located rearward of the seating structure 38, or at least partially beneath the seating structure 35, and remain within the scope of the present disclosure. In such implementations, the respective transmission(s) 54B, 54C and/or 54D can be operably coupled to the respective prime mover 42 via one or more drive shafts, or direct coupled to thereto.

It should be understood that each driveshaft described herein (e.g., driveshaft 50, 50A, 50B, 150A, 150B, 150C, 250A, 250B, 250C, 350A, 350B and 450) can be a single piece driveshaft or a multi-segment driveshaft and remain within the scope of the present disclosure.

Figure 10:
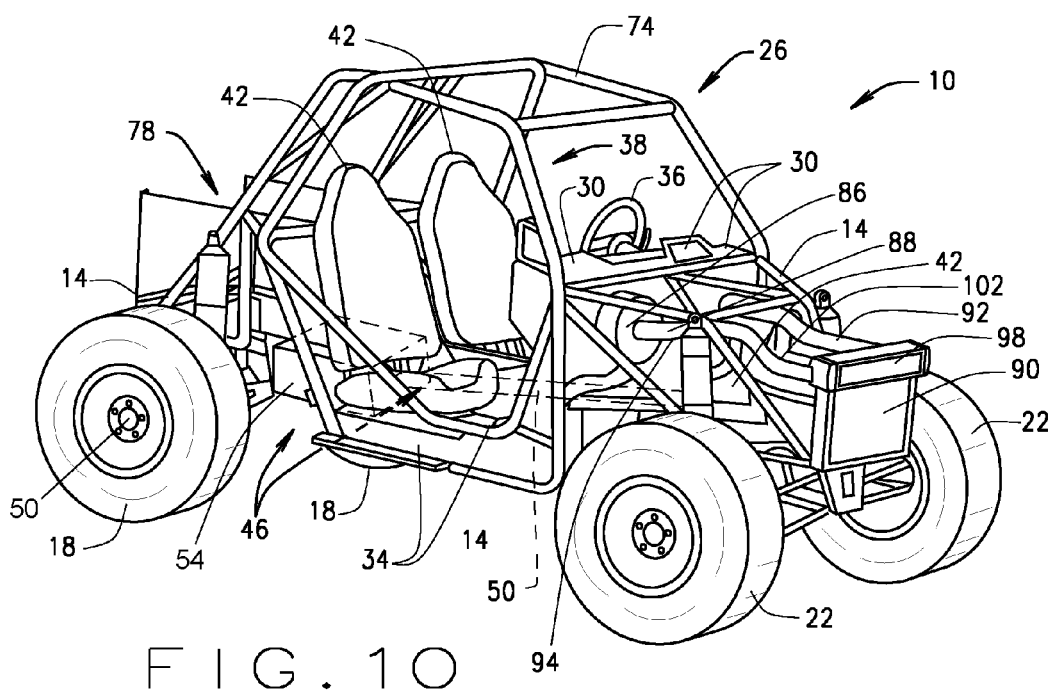
FIG. 10 is an isometric view of the vehicle shown in FIGS. 1A and 1B including an air intake and filter, and a radiator, in accordance with various embodiments of the present disclosure.
Figure 11:
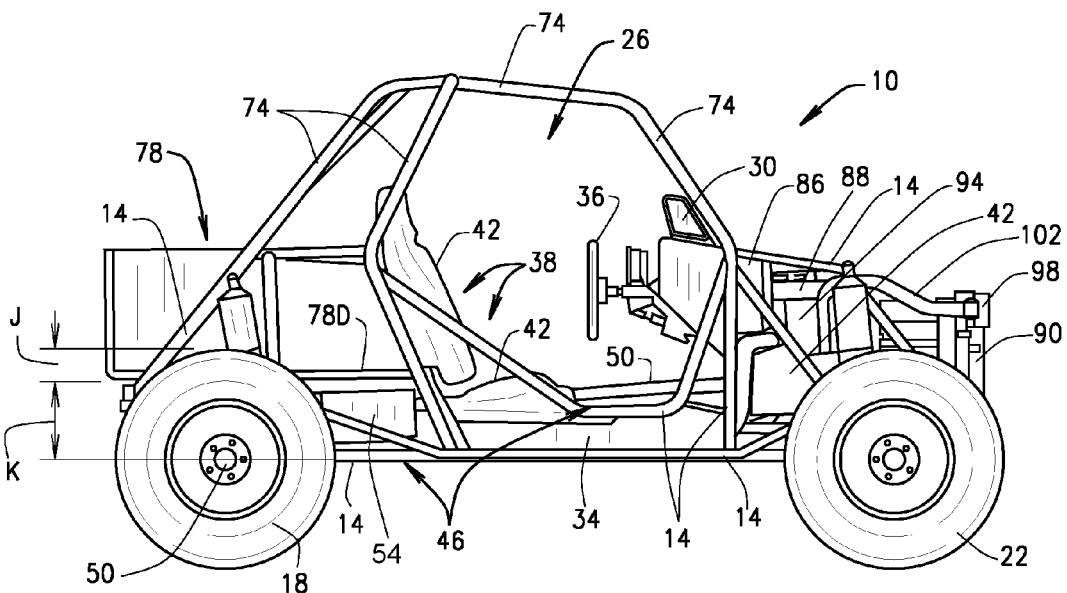
FIG. 11 is a side view of the vehicle shown in FIG. 10, in accordance with various embodiments of the present disclosure.

Referring now to FIGS. 7, 10 and 11, as described above, in the embodiments the prime mover 42 can be an ICE (e.g., an ICE configured to utilize any suitable combustible fuel, such as gasoline, diesel, natural gas, biofuel, some combination thereof, etc.). In various implementations of such ICE embodiments, the vehicle 10 can include an air intake and filter 86 that is fluidly connected to the prime mover 42 (e.g., the ICE) via an air intake manifold 88. The engine air intake and filter 86 and intake manifold 88 are structured and operable to receive air though the engine air intake and filter 86 and provide the air to the ICE via the intake manifold 88, whereafter the air is used during the combustion process of the ICE. The air intake and filter 86 can be located at any suitable location within the vehicle 10. For example, in various implementations, the air intake and filter 86 can be disposed within the dash console 30 such that air is drawn in through the passenger compartment 26, as illustrated by way of example in FIG. 7. Alternatively, in various other implementations, the air intake and filter 86 can be dispose rearward of the seating structure 38, e.g., disposed adjacent one of the sidewalls 78A of the cargo bed 78, or forward of the passenger compartment 26, e.g., adjacent the ICE and under a hood or cowl (not shown) of the vehicle 10. In some example embodiments, multiple air intake and filters 86 can be included and disposed at various locations on the vehicle 10.

Additionally, in various implementations of such ICE embodiments, the vehicle 10 can further include an engine coolant system radiator 86 disposed forward of the prime mover 42 (e.g., ICE). The radiator 90 is fluidly connected with the ICE via one or more radiator hose 92. The radiator 90 and hose(s) 92 are structured and operable to cool and circulate an engine coolant through the ICE to cool and maintain an operating temperature of the ICE within a designated range.

Furthermore, in various ICE embodiments, the vehicle 10 can include an engine turbocharger 94 that is structured and operable to force pressurized air into the ICE in order to increase horse power of the ICE. In such implementations, the vehicle 10 can additionally include an intercooler 98 disposed forward of the ICE. The intercooler 98 is fluidly connected to the turbocharger 94 via one or more intercooler hoses 102. The intercooler 98 and hose(s) 102 are structured and operable to cool the turbocharged air (e.g., pressurized air) by transferring heat to an intercooler coolant (e.g., air or liquid coolant) in order to cool the pressurized air. As described above, the intercooler 98 is disposed forward of the ICE. Particularly, the intercooler can be disposed in any suitable location forward of the ICE. For example, in various implementations, the intercooler 98 can be stacked on top of the radiator 90. Alternatively, in various other implementations the intercooler 98 can be integrated with the radiator 90.

Referring now to FIG. 7, in further implementations of such ICE embodiments, the vehicle 10 can include a fuel tank 106 for retaining fuel (e.g., gasoline or diesel fuel) consumed by the ICE, and one or more battery 110 that provide electrical current for starting the ICE and for powering various instruments, systems and devices of the vehicle 10. In order to allow the seating structure 38 to be closer to the ground and to have lower center of gravity, in various implementations, the fuel tank 106 and battery(ies) 110 can be disposed rearward from the seating structure 38. For example, in various implementations, the fuel tank 106 and/or the battery(ies) 110 can be mounted adjacent and/or below cargo bed 78.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. An off road utility vehicle, said vehicle comprising:
a chassis;
a pair of front wheels and a pair of rear wheels operationally connected to the chassis;
a passenger compartment supported by the chassis, the passenger compartment comprising:
a dash console;
a floorboard; and
a passenger seating structure;
a rollover protection structure connected to the chassis and disposed around at least a portion of the passenger compartment;
a drivetrain operatively connected to at least one of the wheels, the drivetrain comprising:
at least one drive shaft; and
at least one torque transfer device;
a prime mover mounted to the chassis forward of the seating structure and operatively connected to the drivetrain, the prime mover structured and operable to provide motive force to the at least one of the wheels operatively connected to the drivetrain; and
a cargo bed mounted to the chassis rearward of the passenger seating structure, the cargo bed comprising a deck disposed at a height, relative to a surface on which the vehicle sets, that is lower than a top of the rear wheels.

2. The vehicle of claim 1, wherein the prime mover is mounted to the chassis having a longitudinal orientation with regard to a longitudinal axis of the vehicle.

3. The vehicle of claim 1 wherein the torque transfer device comprises a transmission mounted to the chassis having a longitudinal orientation with regard to a longitudinal axis of the vehicle.

4. The vehicle of claim 1 further comprising an exhaust line that is disposed one of:
at least partially beneath the seating structure; and
at least partially along a side of the passenger compartment.

5. The vehicle of claim 1, wherein the torque transfer device is disposed at least partially rearward of the seating structure, and the at least one drive shaft comprises at least one of:
a rear drive shaft operably connected to the prime mover at first end and extending rearward and operably connected to the torque transfer device at an opposing second end, the rear drive shaft disposed at least partially under the seating structure; and
a front drive shaft operably connected at a first end to the torque transfer device and extending forward and operably connected to a front differential at an opposing second end, the front differential operably connected to at least one front wheel.

6. The vehicle of claim 1, wherein the torque transfer device comprises a transaxle disposed at least partially rearward of the seating structure and operably connected to at least one rear wheel, and the at least one drive shaft comprises at least one of:
a rear drive shaft operably connected to the prime mover at a first end and extending rearward and operably connected to the transaxle at an opposing second end; and
a front drive shaft operably connected at a first end to the transaxle and extending forward and operably connected to a front differential at an opposing second end, the front differential operably connected to at least one front wheel.

7. The vehicle of claim 1, wherein the torque transfer device comprises a transmission disposed at least partially rearward of the seating structure, and the at least one drive shaft comprises at least one of:
a primary rear drive shaft operably connected to the prime mover at a first end and extending rearward and operably connected to the transmission at an opposing second end;
a secondary rear drive shaft operably connected to the transmission at a first end and operably connected to a rear differential at an opposing second end, the rear differential operably connected to at least one rear wheel; and
a front drive shaft operably connected at a first end to the transmission and extending forward and operably connected to a front differential at an opposing second end, the front differential operably connected to at least one front wheel.

8. The vehicle of claim 1, wherein the torque transfer device comprises a transmission disposed at least partially beneath the seating structure, and the at least one drive shaft comprises:
a primary rear drive shaft operably connected to the prime mover at a first end and extending rearward and operably connected to the transmission at an opposing second end; and
a secondary rear drive shaft operably connected to the transmission at a first end and operably connected to a rear differential at an opposing second end, the rear differential operably connected to at least one rear wheel; and
a front drive shaft operably connected at a first end to the transmission and extending forward and operably connected to a front differential at an opposing second end, the front differential operably connected to at least one front wheel.

9. The vehicle of claim 1, wherein the torque transfer device comprises a transmission disposed at least partially forward of the seating structure and coupled directly to the prime mover, and the at least one drive shaft comprises:
   a rear drive shaft operably connected to the prime mover at a first end and extending rearward and operably connected to a rear differential at an opposing second end, the rear differential operably connected to at least one rear wheel; and
   a front drive shaft operably connected at a first end to the transmission and extending forward and operably connected to a front differential at an opposing second end, the front differential operably connected to at least one front wheel.

10. The vehicle of claim 1, wherein the torque transfer device comprises a transaxle disposed forward of, and coupled directly to, the prime mover, and the at least one drive shaft comprises a rear drive shaft operably connected to the transaxle at a first end and extending rearward and operably connected to a rear differential at an opposing second end, the rear differential operably connected to at least one rear wheel.

11. An off road utility vehicle, said vehicle comprising:
   a chassis;
   a pair of front wheels and a pair of rear wheels operationally connected to the chassis;
   a passenger compartment supported by the chassis, the passenger compartment comprising:
      a dash console;
      a floorboard; and
      a passenger seating structure;
   a cargo bed mounted to the chassis rearward of the passenger seating structure, the cargo bed comprising a deck disposed at a height, relative to a surface on which the vehicle sets, that is lower than a top of the rear wheels;
   a drivetrain operatively connected to at least one of the wheels, the drivetrain comprising:
      at least one drive shaft; and
      at least one torque transfer device;
   a prime mover mounted to the chassis forward of the seating structure and having a longitudinal orientation with regard to a longitudinal axis of the vehicle, the prime mover operatively connected to the drivetrain and structured and operable to provide motive force to the at least one of the wheels operatively connected to the drivetrain; and
   an exhaust line that is disposed at least partially beneath the seating structure.

12. An off road utility vehicle, said vehicle comprising:
   a chassis;
   a pair of front wheels and a pair of rear wheels operationally connected to the chassis;
   a passenger compartment supported by the chassis, the passenger compartment comprising:
      a dash console;
      a floorboard; and
      a passenger seating structure;
   a rollover protection structure connected to the chassis and disposed around at least a portion of the passenger compartment;
   a prime mover mounted to the chassis forward of the seating structure;
   at least one torque transfer device comprising a transmission disposed at least partially rearward of the seating structure; and
   a drivetrain operatively connected to at least one of the wheels, the drivetrain comprising:
      at least one drive shaft comprising at least one of:
         a primary rear drive shaft operably connected to the prime mover at a first end and extending rearward and operably connected to the transmission at an opposing second end;
         a secondary rear drive shaft operably connected to the transmission at a first end and operably connected to a rear differential at an opposing second end, the rear differential operably connected to at least one rear wheel; and
         a front drive shaft operably connected at a first end to the transmission and extending forward and operably connected to a front differential at an opposing second end, the front differential operably connected to at least one front wheel; and
   wherein the prime mover is operatively connected to the drivetrain and is structured and operable to provide motive force to the at least one of the wheels operatively connected to the drivetrain.

13. The vehicle of claim 12, wherein the prime mover is mounted to the chassis having a longitudinal orientation with regard to a longitudinal axis of the vehicle.

14. The vehicle of claim 12 wherein the torque transfer device is mounted to the chassis having a longitudinal orientation with regard to a longitudinal axis of the vehicle.

15. The vehicle of claim 12 further comprising an exhaust line that is disposed one of:
   at least partially beneath the seating structure; and
   at least partially along a side of the passenger compartment.

16. The vehicle of claim 12, wherein the transmission comprises a transaxle operably connected to at least one rear wheel.

17. The vehicle of claim 12, wherein the torque transfer device is disposed at least partially beneath the seating structure.

18. An off road utility vehicle, said vehicle comprising:
   a chassis;
   a pair of front wheels and a pair of rear wheels operationally connected to the chassis;
   a passenger compartment supported by the chassis, the passenger compartment comprising:
      a dash console;
      a floorboard; and
      a passenger seating structure;
   a rollover protection structure connected to the chassis and disposed around at least a portion of the passenger compartment;
   a prime mover mounted to the chassis forward of the seating structure;
   at least one torque transfer device comprising a transmission disposed at least partially beneath the seating structure; and
   a drivetrain operatively connected to at least one of the wheels, the drivetrain comprising:
      at least one drive shaft comprising:
         a primary rear drive shaft operably connected to the prime mover at a first end and extending rearward and operably connected to the transmission at an opposing second end; and
         a secondary rear drive shaft operably connected to the transmission at a first end and operably connected to a rear differential at an opposing second end, the rear differential operably connected to at least one rear wheel; and a front drive shaft operably connected at a first end to the transmission and extending forward and operably connected to a front differential at an opposing second end, the front differential operably connected to at least one front wheel; and wherein the prime mover is operatively connected to the drivetrain and is structured and operable to provide motive force to the at least one of the wheels operatively connected to the drivetrain.

19. The vehicle of claim 18, wherein the prime mover is mounted to the chassis having a longitudinal orientation with regard to a longitudinal axis of the vehicle.

20. The vehicle of claim 18 wherein the torque transfer device is mounted to the chassis having a longitudinal orientation with regard to a longitudinal axis of the vehicle.

21. The vehicle of claim 18 further comprising an exhaust line that is disposed one of:
   at least partially beneath the seating structure; and
   at least partially along a side of the passenger compartment.

22. The vehicle of claim 18, wherein the torque transfer device comprises a transaxle operably connected to at least one rear wheel.

23. The vehicle of claim 18, wherein the torque transfer is disposed at least partially forward of the seating structure.

24. An off road utility vehicle, said vehicle comprising:
   a chassis;
   a pair of front wheels and a pair of rear wheels operationally connected to the chassis;
   a passenger compartment supported by the chassis, the passenger compartment comprising:
   a dash console;
   a floorboard; and
   a passenger seating structure;
   a rollover protection structure connected to the chassis and disposed around at least a portion of the passenger compartment;
   a drivetrain operatively connected to at least one of the wheels, the drivetrain comprising:
   at least one drive shaft; and
   at least one torque transfer device; and
   a prime mover mounted to the chassis forward of the seating structure and operatively connected to the drivetrain, the prime mover structured and operable to provide motive force to the at least one of the wheels operatively connected to the drivetrain,
   wherein the torque transfer device comprises a transaxle disposed forward of, and coupled directly to, the prime mover, and the at least one drive shaft comprises a rear drive shaft operably connected to the transaxle at a first end and extending rearward and operably connected to a rear differential at an opposing second end, the rear differential operably connected to at least one rear wheel.

25. The vehicle of claim 24, wherein the prime mover is mounted to the chassis having a longitudinal orientation with regard to a longitudinal axis of the vehicle.

26. The vehicle of claim 24 wherein the torque transfer device is mounted to the chassis having a longitudinal orientation with regard to a longitudinal axis of the vehicle.

27. The vehicle of claim 24 further comprising an exhaust line that is disposed one of:
   at least partially beneath the seating structure; and
   at least partially along a side of the passenger compartment.

* * * * *